United States Patent [19]
Beretta

[11] 3,711,004
[45] Jan. 16, 1973

[54] TAPE MISFEEDING PROTECTED RECORDER/REPRODUCER

[76] Inventor: Alessandro Beretta, 16 Piazza Insubria, Milano, Italy

[22] Filed: April 7, 1971

[21] Appl. No.: 131,922

[30] Foreign Application Priority Data

April 9, 1970 Italy ................................23113 A/70

[52] U.S. Cl. ....................................226/181, 226/196
[51] Int. Cl. ............................................B65h 17/22
[58] Field of Search.......226/181, 186, 187, 118, 196

[56] References Cited

UNITED STATES PATENTS 3,608,805 9/1971 Ogata ...............................226/181 X

*Primary Examiner*—Allen N. Knowles
*Assistant Examiner*—Gene A. Church
*Attorney*—Michael S. Striker

[57] ABSTRACT

The disclosure describes the provision and the arrangement, in a magnetic tape recording and reproducing apparatus of the kind in which the tape and the supply and take-up reels are wholly contained into a removable and replaceable magazine or cassette, wherein a pressure roller is partially projecting for assisting the drive of the tape, of a shielding guard encircling said roller, outside the magazine, positioned and shaped to prevent the tape, if not properly winding about the take-up roller, to uncontrolledly expand and jam itself into the environmental space in the apparatus.

10 Claims, 5 Drawing Figures

INVENTOR.
ALESSANDRO BERETTA
BY
[illegible]
Attorney

TAPE MISFEEDING PROTECTED RECORDER/REPRODUCER

BACKGROUND OF THE INVENTION

This invention generally relates with magnetic tape recorder/reproducer devices and, more particularly it is concerned with recorder/reproducers of the type making use of tape magazines or "cassettes," that is to recorder/reproducers in which the tape is wholly contained in a magazine or cassette having a supply reel and a take-up reel, said cassette being a substantially rectangular flat box, replaceably located in the body of the recorder/reproducer, for service, the said body housing and supporting the various mechanical, electric and magnetic means for driving the tape in the cassette and for performing the desired recording and/or reproducing operations.

Said devices are well known and widely used and, therefore, any detailed description thereof is unnecessary, except as to few components thereof, which are of interest for full understanding of the object and the scope of this invention. With known magazlnes or cassettes of this kind, the openings for inserting tape scanning means, a driving shaft or capstan and a pressure roller means are formed in the bottom face, in the lid face and one of the side faces of the magazine. Further, the said supply and take-up reels or cores are provided with slotted bores, essentially co-planar with the said bottom and lid faces, and wherein winding spindles engage for driving such reels.

In the inside of the magazine, the magnetic tape is guided, from supply to take-up reel, and vice-versa, along a path a length of which is parallel and adjacent to the said one side face, the said tape engaging the tape driving and scanning means in various location along said length. The drive of the tape, at the predetermined, uniform and relatively slow speed for recording or reproducing, is provided by its frictional engagement with a driving shaft or capstan (a spindle of small diameter), and such engagement is ensured by a pressure roller (generally a small rubber coated pulley) which presses from outside the tape against the driving capstan which, when the magazine is engaged in the apparatus, is located adjacent to the inward turned face of the tape. One of the said openings on the said one side faces of the magazine is designed for allowing the said pressure roller to partially pass thereinto and pressingly engage the outward turned face of same tape.

Downstream of its passage between said driving capstan and pressure roller, when running towards the take-up reel, the tape is subject to a slight continuos pull from said take-up reel, which is continuously driven by means a trasmission mechanism including a frictional drive which is suitably adjusted for ensuring that such pull will be proper for correct winding of the tape but not overcoming the drive force exerted by the driving capstan, so that the said uniform predetermined speed of the tape is maintained.

The above operative conditions are those of regular operation of the device. Even if exceptionally, certain misfeeding occurs during recording or reproducing, when the said slight pull by the take-up reel is missing or defective. For example, the leading end of the tape, which should be secured to the core of the take-up reel, might have been detached therefrom. The frictional drive might have been become worn or defective. The winding of the tape about the take-up core might have unproperly developed and the tape might encounter, frictionally engaging the stationary lateral surfaces of the cassette, a resistance higher than that which can be overcame by the slight driving torque applied by the said frictional drive, and so on.

In such occurrences, the tape, which is caused to issue from the bite formed between the driving capstan and the pressure roller, trends to curve adjacently to the pressure roller, upon slacking or becoming loose past the capstan and to form a loop outside the magazine, passing between the surface of said roller and the edge of the opening in which said roller is partially projecting in the magazine and therefore the looped tape enters in any environmental space in the recorder/reproducer, jamming thereinto.

Who makes use of the apparatus cannot be noticed of such occurrence because the same apparatus is apparently regularly operating. The capstan continues to pull the tape on the scanning means and, when reproducing, the sound continues. As more the apparatus is "on," as more such looped tape expands in the environment outside the magazine, folding and tamping itself in any available adjacent space, until the tape will became so jammed that it cannot be more progressed by the driving capstan. Apart from the damage that the various components and mechanisms of the apparatus can suffer, when entangled with the jammed tape, such occurrence will anytime be at least a serious inconvenient. The tape will be severely damaged and the magazine cannot be regularly removed from the apparatus. The apparatus must be open and partially disassembled, by skilled personnel at a repair shop, leading to expenses and to a long out-of-service time.

It is therefore the object of this invention to provide a simple but effective protection, in a recorder/reproducer apparatus of the kind referred to above, designed for eliminating or at least minimizing such and other inconvenients. More particularly, it is an object of this invention to provide a tape misfeeding protected magnetic tape recorder and reproducer, including protective means designed to prevent the tape, if unproperly fed to and wound about the take-up reel, to coiledly expand and jam inside the spaces in the apparatus adjacent to the magazine, and to tie the same to the apparatus.

BRIEF SUMMARY OF THE INVENTION

According to the invention, there is provided a stationary shielding element, or guard, about the pressure roller. Such element or guard encircles the said roller, except where it faces and partially projects into the magazine, when said magazine is properly set into the apparatus for operation, and the tape scanning means and the said pressure roller engage the tape. The said stationary (relatively to the pressure roller) shielding element or guard is open where facing the magazine, set as above, and has end edge portions located adjacent to and slightly outside the edges of the opening, formed in the said one side face of the magazine, wherein the said roller partially projects for frictionally engaging the tape. The said element or guard forms and defines a small space about the part, external to the magazine, of the said pressure roller.

The thus arranged guard, therefore, forms a partition wall which separates the area wherein the said pressure roller is located from the adjacent areas or spaces inside the apparatus, and the said partition wall intercepts the direction or directions in which the said looped tape trends to pass and expand into the said adjacent spaces if and when the above discussed inconvenient or tape misfeeding occurs. In such occurrence, the looped tape, trending to initially follow the curvature of the surface of the pressure roller, is caused to completely wind itself about said roller, forming a coil which, when engaging between the roller and the driving capstan, encounters a remarkable resistance which prevents the tape to further progress in the magazine, thus causing the apparatus to stop well before too many coils would be wound about the pressure rollers.

The user of the recorder/reproducer is therefore promptly made aware of the misfunctioning of the apparatus and can provide therefor. The magazine can be easily removed from the apparatus, because the said few coils of looped tape can easily and effordlessy unwind from said pressure roller, when the magazine is being spaced therefrom. The tape remains unnoticeably damaged by such winding and the subject matter which has been registered thereon will remain essentially uneffected. If the magazine has been found responsible of the misfunctioning (in the most of such occurrences, there has been the tape leading end which was detached from the take-up reel core), the recorder/reproduced can be immediately made use of again with another magazine.

These and other objects and features of the invention will be now made more readily apparent from the following detailed description of a preferred embodiment of same invention, reference being made to the accompanying drawing, forming an essential component of this disclosure, and wherein only the components, arrangements and combinations of parts, related to the invention, have been illustrated, all remaining parts, components and devices of the magnetic tape recording and reproducing apparatus and of the magazine or cassette appertaining to current art.

THE VIEWS OF THE DRAWING

FIG. 1 diagrammatically and fragmentarily illustrates a magazine of the kind referred above, including a magnetic tape properly engaging with scanning and driving means, foe operation, in sectional view taken in a plane parallel to and between the major faces of the magazine;

FIG. 2 illustrates a part of the components shown in FIG. 1, the magazine being spaced from the pressure roller;

FIG. 3 diagrammatically and fragmentarily illustrates, in enlarged scale, the components encompassed within contour indicated at —III— in FIG. 1, in the occurrence that a tape misfeeding initiates; and FIGS. 4 and 5 correspond to FIG. 3 and show the progressing of coiling of the tape about the roller.

DETAILED DESCRIPTION OF THE PREFERRED EMBODIMENT

Figures 1, 2, 3, 4, 5:
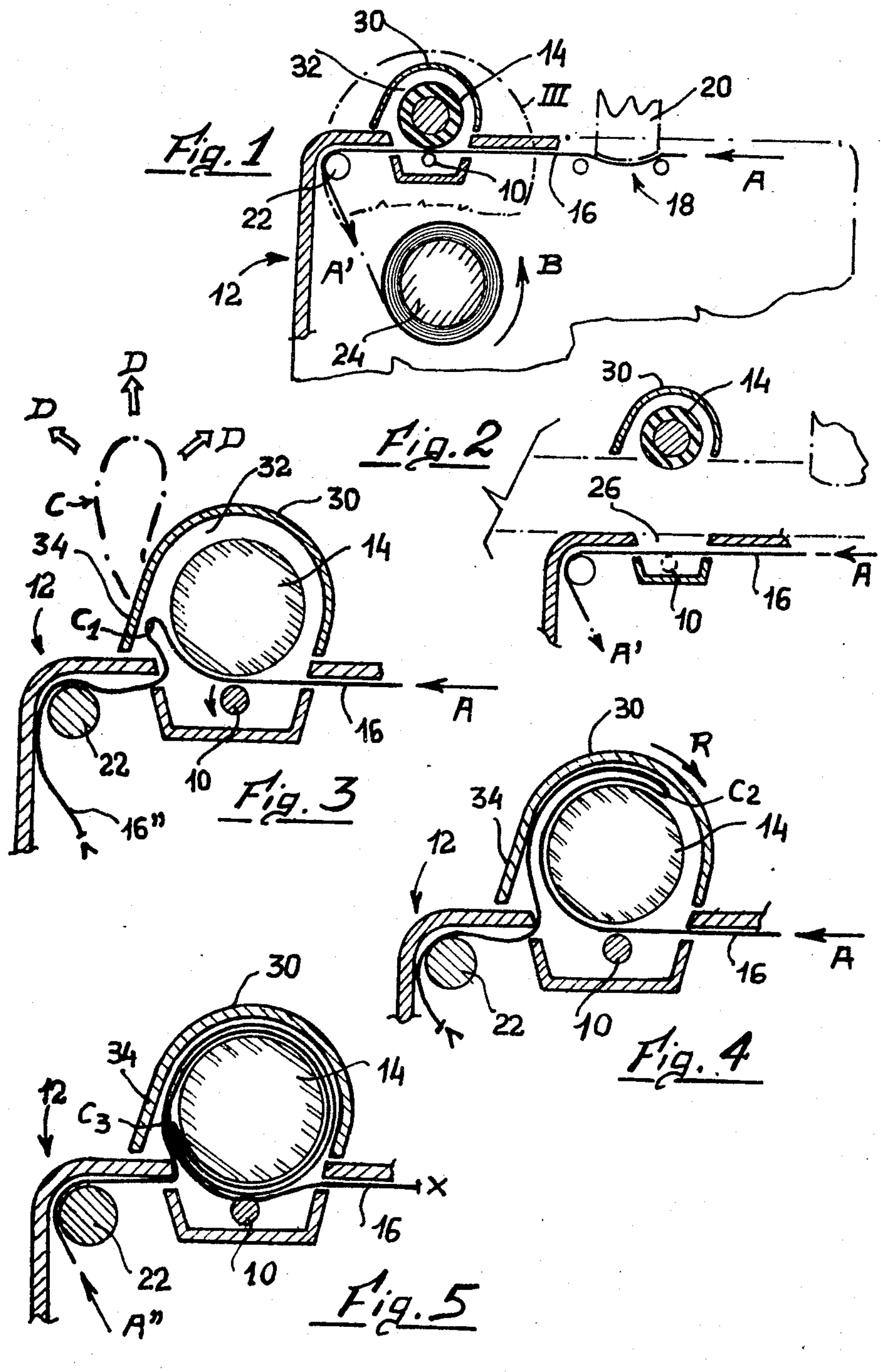

FIG. 1 illustrates the well known regular arrangement of parts, which are relevant for the invention, during the recording or the reproducing operation of the apparatus. The driving capstan 10, which in operation is inside the magazine or cassette 12, cooperates with the pressure roller 14 for uniformly driving the magnetic tape 16, in direction A. The said driving capstan 10 is conventionally driven at a predetermined and relatively slow speed by drive means (not shown), and the pressure roller 14, which is conventionally provided with a rubber coating, is biased by spring means (not shown) towards the said capstan 10, for urging the tape 16 thereagainst and thus ensuring the frictional engagement therewith. The said predetermined speed of the tape (in direction A) is adjusted for proper recording and reproducing, the tape engaging at one its portion 18, upstream to capstan 10, with magnetically scanning means, such as diagrammatically indicated at 20.

Downstream of its passage between the capstan 10 and the pressure roller 14, the tape 16 is guidedly progressed towards and about the core of the take-up reel 24, an idle guide roller 22 being for example provided therefor in the magazine. The arrow A' indicates either the direction of the downstream part of the tape and that of the slight pull exerted by said core, which is driven by conventional drive means (not shown) including frictionally engaging pulleys (not shown) for ensuring that said pull A' does not overcome the tractive force applied in direction A by the cooperation of the driving capstan 10 and of the pressure roller 14. The curved arrow B indicates the direction in which the said core is driven when the tape is being taken-up thereabout to form the reel 24.

The upper side face of the magazine 12 is conventionally provided with openings adapted and positioned for passage of the tape driving and scanning means, which must engage the outwardly turned face of the tape, as shown. As essential for the invention, one of said openings, indicated at 26 in FIG. 2, is provided for free passage of the pressure roller 14 and it is dimensioned with suitable excess for ensuring the necessary clearance, taking into consideration that such magazines or cassettes are provided for adaptation with apparatuses, manufactured by different manufacturers, having pressure rollers of not strictly standard diameter.

Referring now to FIG. 3, there is shown as the tape 16 behaves if the pull (indicated at A' in FIG. 1) is missing or defective. The downstream portion of the tape, indicated at 16'', becames loose and slacks, while the upstream portion of same tape continues to issue, in direction A, from between the driving capstan 10 and the pressure roller 14. In such occurrence, the tape forms a loop, such as indicated at C1, which, if not barren from, will uncontrolledly expand outside the magazine, such as indicated at C in dot-and-dash line, becoming larger and larger in any of directions such as shown by arrows D, until jamming inside any adjacent existing space in the apparatus, thus leading to the above discussed inconvenient.

According to the invention, about the said pressure roller 14, where outside the magazine 12, in operation, there is provided a guard 30, stationarily supported at least relatively to the said roller 14. Such guard 30 has a generally semicircular configuration and it is pretty close to said pressure roller 14, confining a small space 32 thereabout. Preferably, the semicircular portion of the guard 30 is not co-axial with the roller, and the said space 32 progressively narrows in direction concurrent with the direction R (FIG. 4) in which the roller 14 rotates. Said guard 30 is open where facing the said opening 26 of the magazine.

One portion 34 of the guard 30, adjacent to the magazine 12, on the side of the opening 26 in the direction in which the tape issues from between capstan 10 and roller 14, is located to form a shield preventing the initially formed loop C1 to expand outside, as shown in FIG. 3. Therefore, as the looped tape further progresses past the capstan 10, it is caused to progress only within the said confined space 32, winding itself in direction R about the pressure roller 14, such as indicated at C2 in FIG. 4 and at C3 in FIG. 5. When the said looped tape forms one or very few coils, the thickness of the winding becomes such that the drive means cannot further operate and the apparatus stops.

When such occurrence is on, the user of the apparatus is generally made aware. For example, if the apparatus is being reproducing, the sound is being discontinued. Even if the apparatus will not been disactivated, the stopping of the tape progression will prevent more serious damages. Assuming that the tape has been wound about the pressure roller 14, as shown in FIG. 5 or even more coiled about, by spacing the magazine from such roller (that is by performing the current magazine removal operation) the few centimeters of tape, looped and wound about the roller, will promptly and effordlessy unwind therefrom and the magazine can be easy removed from the apparatus, without any damage thereof.

I claim:

1. In a tape transporting apparatus, a combination comprising guide means for normally guiding the tape along a predetermined path, the tape being subject to deviation from said path upon misfeeding; first and second tape engaging rotary elements positioned opposite each other at the opposite sides of said path; means for rotating said first element; and shielding means at least partially surrounding one of said rotary elements and defining therewith a space for collection of the tape which deviates from said path whereby such tape produces on said one of said rotary elements a braking action to thereby at least reduce the speed of transport of the tape.

2. A combination as defined in claim 1, wherein said first element is a capstan and said second element is a pressure roller, and wherein said shielding means at least partially surrounds said pressure roller.

3. A combination as defined in claim 2, wherein the tape transporting apparatus cooperates with a magazine containing the tape, the magazine having an aperture for receiving a portion of said pressure roller, and wherein said shielding means substantially surrounds the portion of said pressure roller which remains outside of the magazine.

4. A combination as defined in claim 3, wherein said shielding means comprises a curved guard having spaced end portions defining an opening facing said aperture, one of said end portions being positioned downstream of said aperture adjacent to the magazine an forming blocking means, whereby tape which deviates from said predetermined path downstream of said pressure roller is prevented from extending beyond said one end portion and is urged into said space.

5. A combination as defined in claim 4, wherein said guard is substantially semicircular in shape.

6. A combination as defined in claim 4, wherein said space defined by said second rotary element and said shielding means is generally of semicircular shape, whereby the tape which deviates from said predetermined path winds itself about said pressure roller subsequent to entering said space.

7. A combination as defined in claim 6, wherein said semicircular space has a width measured radially of said pressure roller which decreases progressively from said one end portion to the other end portion.

8. A combination as defined in claim 2, wherein said shielding means is stationarily mounted relative to said pressure roller during transport of the tape.

9. A combination as defined in claim 2, wherein said pressure roller has an outer bearing surface, and wherein said shielding means comprises a curved part essentially having the hsape of said pressure roller surface, and an end portion downstream of the position where the tape is engaged and adjacent to said predetermined path, whereby issuing tape in the region of said end portion which becomes slack due decrease in tension downstream of said end portion causes the resulting loops of tape to abut against said end portion, to deviate within the shielding element and to wind said said pressure roller until the resistance to turning of the latter exceeds the driving forces provided by said means for driving the capstan and further transport ceases.

10. A combination as defined in claim 9, wherein the curved part of said shielding element progressively approaches said outer bearing surface of said pressure roller in the direction in which said pressure roller rotates, whereby said resistance is built up after a few turns of the looped tape is wound about said pressure roller.

* * * * *